Nov. 30, 1948.  C. W. HANSEN ET AL  2,455,122
WINDROW DEVICE

Filed Jan. 22, 1945  3 Sheets-Sheet 1

Inventors:
Charles W. Hansen
and Frank N. G. Kranick,
By Soons, Pond & Anderson
Attorneys.

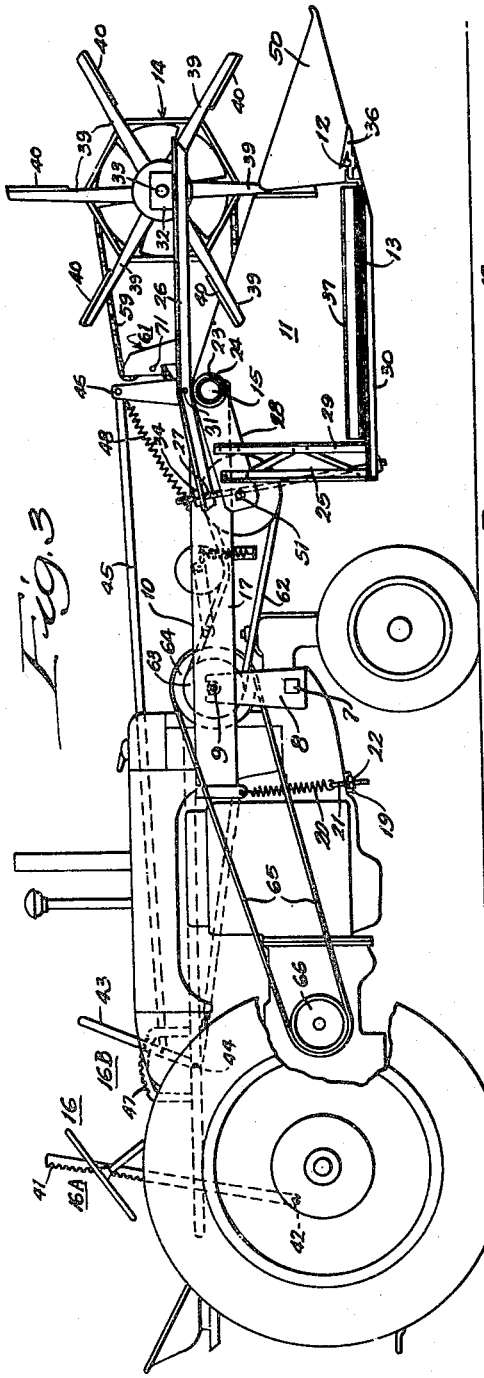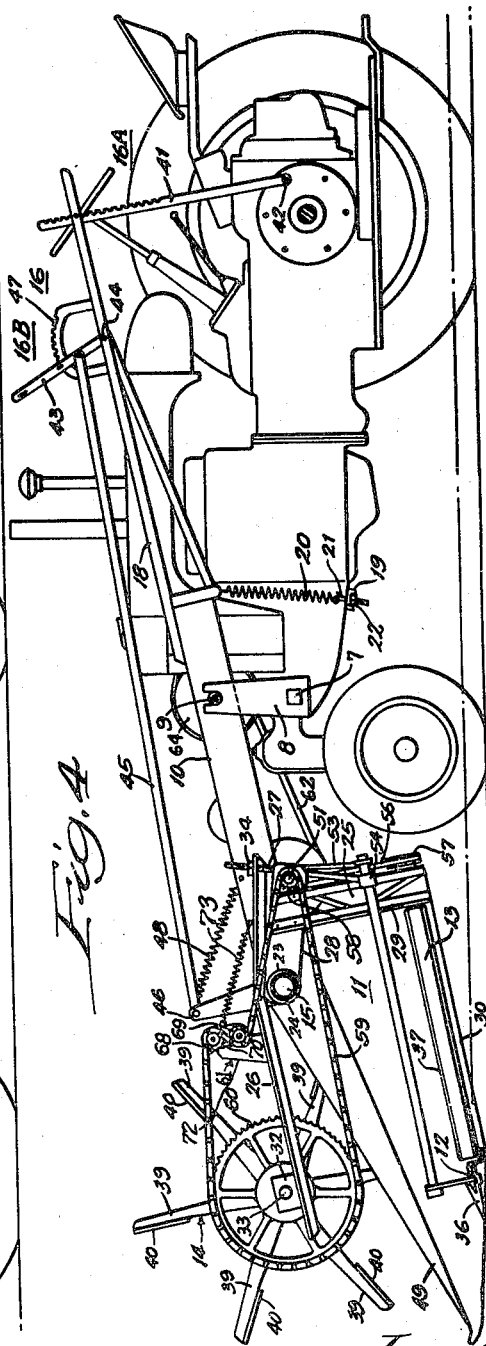

Nov. 30, 1948.  C. W. HANSEN ET AL  2,455,122
WINDROW DEVICE

Filed Jan. 22, 1945  3 Sheets-Sheet 3

Inventors:
Charles W. Hansen
and Frank N. G. Kranick,
By Swan, Paul & Henderson
Attorneys.

Patented Nov. 30, 1948

2,455,122

UNITED STATES PATENT OFFICE 2,455,122

WINDROW DEVICE

Charles W. Hansen and Frank N. G. Kranick, Racine, Wis., assignors to J. I. Case Company, Racine, Wis., a corporation of Wisconsin Application January 22, 1945, Serial No. 573,882

7 Claims. (Cl. 56—23)

The present invention relates to harvesting machines commonly known as windrowers wherein the grain, as cut, is conveyed to an opening through which it is laid along the ground in the form of a windrow. Machines of this kind require such a construction and arrangement of their several parts that, whether pulled or pushed, they will accomplish two major results with the greatest possible effectiveness.

First, the machine must be capable of such adjustment that it may be accommodated to grain of various heights and conditions of stand. Secondly, the machine must lay the grain in windrows so that they will not have to be traversed subsequently by the machine, or the draft means, as the normal harvesting operation continues.

The main objects of this invention, therefore, are to provide an improved construction of a push type windrower, particularly suitable for cantilever suspension on the front end of a tractor; to provide an improved mounting for the grain-cutting and conveying mechanisms and the grain reel on a main supporting frame; to provide improved means for easily shifting the windrower as a whole into and out of its operational position, and for shifting the grain reel and the grain-cutting and conveying mechanisms to accommodate various conditions of the grain to be harvested; and to provide an improved arrangement of the means for transmitting the power drive of the tractor to the several mechanisms of the windrower.

In the particular embodiment of the invention herein shown:

Fig. 3 is a right-hand side elevation of the arrangement shown in Fig. 1, with the windrower elevated to the position that it occupies when being inoperatively transported from place to place;

Fig. 4 is a left-hand side elevation of the same, showing the windrower in grain-cutting position with the plane of the conveyor mechanism disposed at an angle to the horizontal;

Figures 1, 2:
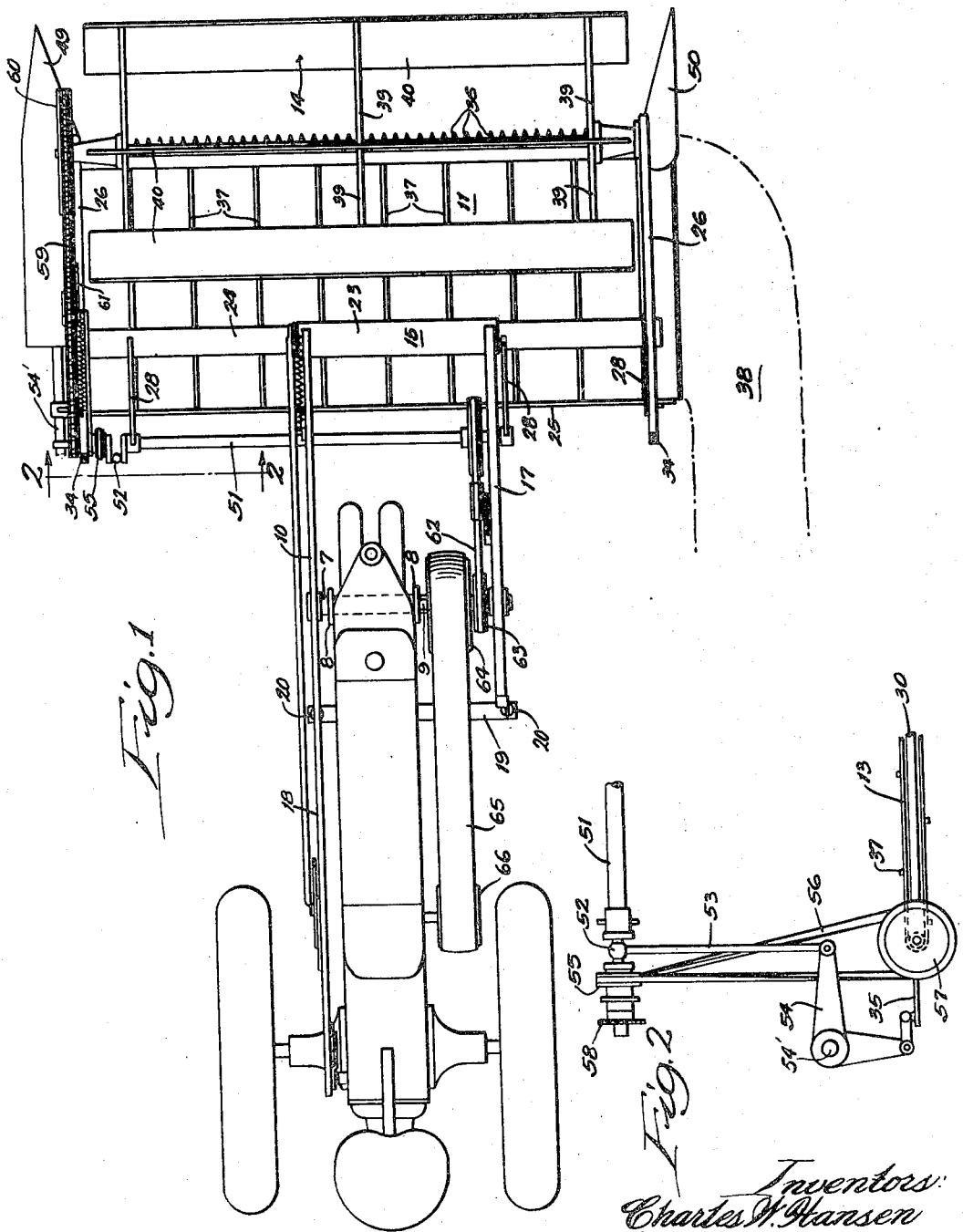
Fig. 1 is a plan view of a windrower of the push type, mounted on the forward end of a tractor.
Fig. 2 is a rear elevation, taken on the line 2—2 of Fig. 1, of the means which drives the grain-cutting and conveying mechanisms.
Figure 5:
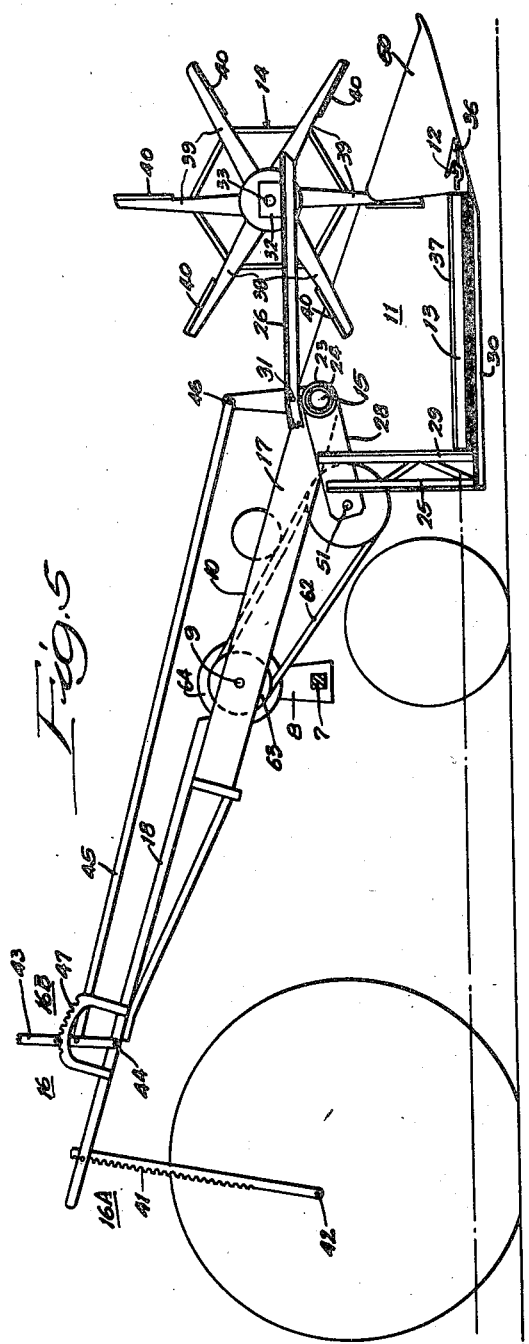
Figs. 5 and 6 are right-hand side elevations similar to Fig. 3, in more or less diagrammatic outline, illustrating two other harvesting positions of the windrower wherein the plane of the grain conveyor is more or less parallel with the horizontal.
Figure 6:
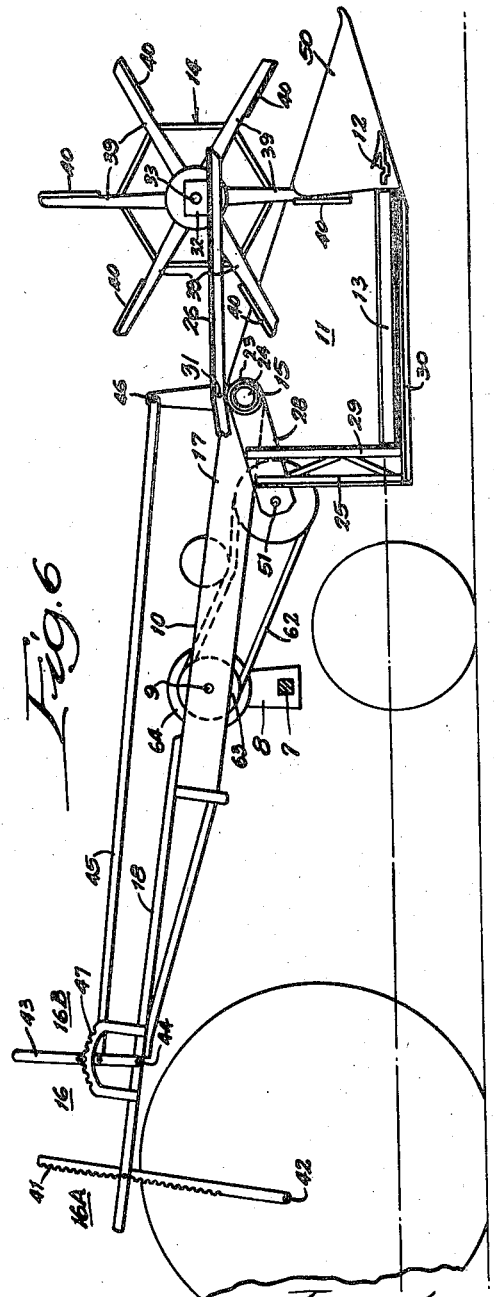

Because so much of the structure and mechanisms herein shown are of a conventional nature no attempt has been made to be exact and complete in the illustration thereof. It is assumed that the form and connections will be readily understood from their outline or diagrammatic appearance in the drawings.

A push-type windrower constructed in accordance with this invention is particularly designed for cantilever mounting on the forward end of a conventional type farm tractor. The tractor frame is equipped with sockets (not shown) wherein bars may be set to extend out to the sides of the tractor to permit the attachment of various farm implements. Support for the windrower on the forward end of the tractor, is provided in the form of stub bars 7 formed on the brackets 8, the bars 7 being secured in the aforesaid sockets so as to support the brackets 8 on opposite sides of the tractor frame. The bars provide bearings for a supporting shaft 9.

The windrower itself comprises a main frame 10, tiltably supported on the brackets 8 by means of the shaft 9, and an auxiliary frame construction 11, providing support for the grain-cutting mechanism 12, the grain-conveying mechanism 13, and the grain reel mechanism 14. The main and auxiliary frame constructions 10 and 11 are connected together at 15 to permit relative angular adjustment for the purpose of regulating the angularity of the grain-cutting and conveying mechanisms relative to the horizontal as may be required by the conditions of the grain to be harvested.

Driving means for the grain-cutting mechanism 12, the grain-conveying mechanism 13, and the grain reel 14 is likewise mounted on the main frame 10 and the auxiliary frame structure 11, and is connected to the tractor power unit, as will more clearly hereinafter appear. Likewise shifting mechanism 16 is arranged on the main and auxiliary frame structures 10 and 11, for rocking or tilting the windrower as a whole relative to the tractor and effecting angular movements of the main and auxiliary frame structure relative to each other.

The main frame 10 comprises a pair of arms 17 and 18 for location on opposite sides of the front portion of the tractor with ends of the shaft 9 serving as trunnions whereby the main frame is tiltably supported on the brackets 8. The arm 17 extends only a short distance rearwardly of the brackets 8, whereas the arm 18 extends rearwardly to a point near and adjacent the tractor axle. Here it is connected with one of the parts of shifting mechanism 16, as will more fully hereinafter appear. A bar 19, secured to the under side of the tractor frame rearwardly of the brackets 8, has springs 20 connected between the ends thereof and the frame 10 to serve as a resilient counter-balance to the weight of the auxiliary frame structure 11 and its operating mechanisms. Each of the springs 20 is connected to the bar 19 by means of an eye bolt 21 and a nut 22, whereby the tension of the springs 20 may be adjusted as occasion may require. A tubular member 23 connects the forward end of the arms 17 and 18 and rotatably supports a tube or hollow shaft 24 to provide the pivotal connection 15 between the main and auxiliary frame structures 10 and 11.

The auxiliary frame structure 11 includes a rearwardly and downwardly extending section 25 for supporting the grain-cutting mechanism 12 and the grain-conveying mechanism 13, and a pair of forwardly extending arms 26 which provides a support for the grain reel 14. The section 25 and arms 26 are supported on the bar or shaft 24 and provided with adjusting means 27 (see Fig. 4) whereby the position of the grain reel with respect to the grain-cutting mechanism and grain-conveying mechanism may be altered.

The section 25 of the auxiliary supporting frame 11 includes a pair of arms 28 secured to the bar 24 near the ends thereof and extending rearwardly, from which depends a strut-form 29, which in turn provides support for a platform 30 on which is supported the grain-cutting mechanism 12 and grain-conveying mechanism 13. The arms 26 of the auxiliary frame structure 11 are pivoted at 31 to suitable brackets secured to the bar 24. These arms have bearings 32 fixed on their forward ends for supporting the shaft 33 of the grain reel 14. These arms extend rearwardly of the pivotal connection 31 to permit connection thereto of the adjusting means 27. This adjusting means is in the form of a threaded rod, the lower end of which is secured to the strut-form 29, and a nut 34, on the upper end, turnable for adjusting the angularity of the section 26 relative to the section 25 of the auxiliary frame structure 11.

The grain-cutting mechanism 12 and conveying mechanism 13 are both of conventional structure. The former embodies a sickle 35 (see Fig. 2) reciprocatingly mounted on the usual guard frame 36 and positioned along the forward end of the platform 30. The latter mechanism embodies a canvas, apron, or draper equipped with the usual strips 37 and extending around pulleys journaled at opposite ends of the platform 30. As will be more fully hereinafter pointed out, this apron, draper, or conveyor 13 travels to the right of the operator of the tractor so that the grain is laid in a windrow 38 along one side of the windrower machine.

The grain reel mechanism is likewise of conventional nature. It comprises the usual radially arranged arms 39 connected by bats 40 and secured to the shaft 33 mounted in the bearings 32 on the section 26 of the auxiliary frame structure 11. The aim is to position the reel above the grain-cutting mechanism 12.

The shifting mechanism 16 for the windrower comprises a section 16A for tilting the main frame 10 on the tractor and a section 16B for altering the angularity of the auxiliary frame structure 11 with regard to the main frame 10. The section 16A includes a conventionally notched bar 41, pivoted at 42 on the tractor frame and having the upper end engaged by the usual spring-actuated pawl (not shown) mounted on the outer end of the extended end of the frame arm 18. The section 16B includes a lever 43 pivoted at 44 on the frame arm 18 and connected by a link 45 to an arm 46 rigidly secured to the bar 24 and extending upwardly therefrom. The conventional form of notched detent 47 mounted on the frame arm 18 co-acts with a spring-urged pawl (not shown) on the lever 43 for securing the lever 43 in any one of its shifted positions. A counter-balancing spring 48 is connected between the upper end of the arm 46 and the arm 18 of the main frame 10.

Dividers 49 and 50 of conventional design and arrangement are secured at the sides of the auxiliary frame structure 11 so as to extend forwardly thereof.

The driving mechanism for the windrower comprises a main shaft 51 journalled near the forward end of the main frame 10 and extending across, and out to the left-hand end of the auxiliary frame structure 11. Near the outer end of the shaft is a crank 52 which, by means of a pitman 53, is connected to a bell-crank lever 54, (including a shaft 54' extending along the side of the frame 11) which in turn, is connected to the sickle-bar 35. Beyond the crank 52 is a pulley 55 which is connected by a belt 56 to a pulley 57, in turn connected to one of the rollers 67 forming a part of the grain-conveyor 13. Still further beyond the pulley 55 is a sprocket 58 which is connected by a chain 59 to a sprocket 60 on the grain reel 14. This chain drive 59 is equipped with a conventional type tension device 61 (see Fig. 4). This tension device includes a pair of sprockets 68 and 69 mounted on an arm 70 pivoted at 71 on a bracket 72 which bracket is actuated by a spring 73 to urge the sprocket 68 rearwardly and the sprocket 69 forwardly to take up the slack in the chain.

The driving of the shaft 51 is effected by means of a belt 62 connected to a pulley 63 supported on the shaft 9 and which supports another pulley 64 connected by a belt 65 to a pulley 66, which is a constructional part of the tractor power unit.

A windrower constructed in accordance with this invention can be mounted on, or dismounted from, the forward end of a tractor with comparative ease and with a very short lapse of time. The attachment of the windrower requires only the setting of the shaft 9 in the brackets 8 and connecting the spring 20, the putting on of the belt 65, and the slipping of the notched bar 41 into engagement with the conventional spring-actuated pawl on the arm 18. The detachment of the windrower from the tractor would call merely for a reversal of these connections. Once the windrower is positioned on the brackets 8 and the shifting mechanism 16A positioned so as to elevate the grain-cutting, grain-conveying, and reeling mechanisms, the windrower may be inoperatively transported from place to place.

When it is desired to harvest grain the shifting mechanism 16A is actuated so as to lower the forward end of the main frame 10. The shifting mechanism 16B is then actuated so as to secure the proper angularity of the grain-cutting mechanism 12 with regard to the ground, as may be required by the conditions of the grain to be harvested.

When it is desired to use the tractor for other purposes, the windrower is very quickly and easily removed and conveniently stored until there is again occasion to mount it on the tractor.

Variations and modifications in the details of the structure and arrangement of the parts may be resorted to within the spirit and coverage of the appended claims.

We claim:

1. A push-type windrower comprising, a pair of main-frame arms having trunnions thereon for supporting said frame on tractor brackets on a fixed axis coaxial with a driving element adapted for connection with the power unit of the tractor and the hereinafter-mentioned mechanisms, said arms being connected together at their forward ends by a member, a shaft rotatably supported on said member with the ends of said shaft extending beyond the ends of said member, an auxiliary frame structure including a depending section and a forwardly-extending section supported on said shaft so as to be shiftable relative to each other, one of said sections providing a support for the conventional grain-cutting and conveying mechanisms and the other section providing a support for a conventional grain reel above said grain-cutting and conveying mechanisms, adjustable means connecting the two sections of said auxiliary frame structure and adapted to alter the operative relationship of said grain reel to said grain-cutting and conveying mechanisms, means on said main-frame arms connected to rotate said shaft on said member for adjusting the angularity of said auxiliary frame structure relative to said main-frame arms, and other means on said main-frame arms adapted to act with the tractor for adjusting the angularity of said main-frame arms relative to the horizontal.

2. A push-type windrower comprising, a pair of main-frame arms having trunnions thereon for supporting said frame on tractor brackets on a fixed axis coaxial with a driving element adapted for connection with the power unit of the tractor and the hereinafter-mentioned mechanisms, said arms being connected together at their forward ends by a tubular member, a shaft rotatably supported in said tubular member with the ends of said shaft extending beyond the ends of said tube, an auxiliary frame structure including a depending section and a forwardly-extending section supported on said shaft so as to be shiftable relative to each other, one of said sections providing a support for the conventional grain-cutting and conveying mechanisms and the other section providing a support for a conventional grain reel above said grain-cutting and conveying mechanisms, adjustable means connecting the two sections of said auxiliary frame structure and adapted to alter the operative relationship of said grain reel to said grain-cutting and conveying mechanisms, means on said main-frame arms connected to rotate said shaft on said tubular member for adjusting the angularity of said auxiliary frame structure relative to said main-frame arms, other means on said main frame arms adapted to act with the tractor for adjusting the angularity of said main-frame arms relative to the horizontal, and a yielding connection between said main-frame arms and the tractor located inwardly of said trunnion axis and constituting a counter-balance for the mechanisms supported on the outer end of said main-frame arms.

3. A push-type windrower comprising, a pair of main-frame arms having trunnions thereon for supporting said frame on tractor brackets on a fixed axis coaxial with a driving element adapted for connection with the power unit of the tractor and the hereinafter-mentioned mechanisms, said arms being connected together at their forward ends by a tubular member, a shaft rotatably supported in said tubular member with the ends of said shaft extending beyond the ends of said tube, an auxiliary frame structure including a depending section and a forwardly-extending section supported on said shaft so as to be shiftable relative to each other, one of said sections providing a support for the conventional grain-cutting and conveying mechanisms and the other section providing a support for a conventional grain reel above said grain-cutting and conveying mechanisms, adjustable means connecting the two sections of said auxiliary frame structure and adapted to alter the operative relationship of said grain reel to said grain-cutting and conveying mechanisms, means on said main-frame arms connected to rotate said shaft on said tubular member for adjusting the angularity of said auxiliary frame structure relative to said main-frame arms, other means on said main-frame arms adapted to act with the tractor for adjusting the angularity of said main-frame arms relative to the horizontal, and a yielding connection interposed between said shaft and main-frame arms and serving as a counter-balance for the mechanism attached on said auxiliary frame structure to lessen the power required for altering the angularity of said auxiliary frame structure on said main-frame arms.

4. A push-type windrower comprising, a main frame including a pair of arms adapted for trunnioned support on tractor brackets and connected together at their forward ends by a tubular member, a shaft rotatably supported in said tubular member with the ends of said shaft extending beyond the ends of said tube, an auxiliary frame structure secured to said shaft including a depending section for supporting conventional grain-cutting and conveying mechanisms and a forwardly extending section for supporting a conventional grain reel above said grain-cutting and conveying mechanisms, adjustable means connecting the sections of said auxiliary frame structure and adapted to alter the operative relationship of said grain reel to said grain-cutting and conveying mechanisms, means on said supporting frame connected to rotate said shaft in said tubular member for adjusting the angularity of said auxiliary frame structure to said main frame, other means on said frame adapted to act with the tractor for adjusting the angularity of said main frame relative to the horizontal, a yielding connection between a rear portion of said supporting frame and the tractor constituting a counter-balance for the mechanisms supported on the outer end of said frame, and a yielding connection interposed between said shaft and main frame and serving as a counter-balance for the mechanism attached to said auxiliary frame structure whereby to lessen the power required for altering the angularity of said auxiliary frame structure relative to said main frame.

5. A push-type windrower comprising, a main frame including a pair of arms connected together at their forward ends by a tubular member, a drive shaft extending across said arms intermediate the ends thereof and providing trunnions for supporting said main frame on tractor brackets for a vertical rocking movement about the axis of said shaft, a supporting shaft rotatably mounted on said tubular member, a mounting for conventional grain reel and grain-cutting and conveying mechanisms secured to said supporting shaft and adapted for vertical angular adjustment relative to said frame, a driven shaft journaled adjacent the forward end of said frame arms parallel to and extending outwardly along one end of said supporting shaft and having belt and pulley means supported thereon and connected to operate said grain reel and grain-cutting and conveying mechanisms, power transmitting connections on said drive shaft for connection with a tractor power unit and with said driven shaft, and adjusting means mounted on said frame for respectively adjusting the angularity of said frame relative to the horizontal and the angularity of said grain reel and said grain-cutting and conveying mechanisms with respect to said main frame.

6. In a push-type windrower for use with a tractor, a pair of longitudinally extending, spaced-apart main frame arms, brackets adapted to be attached to the associated tractor, means for pivotally supporting said frame arms on said brackets, said arms being connected together at their forward ends by a transversely extending member, a shaft rotatably supported on the forward portion of said interconnected frame arms with the ends of said shaft extending beyond the ends of said transversely extending member, an auxiliary frame structure comprising a depending section and a forwardly extending section supported on said shaft, said depending section and said forwardly extending section being shiftable relative to one another, means for adjusting said sections relative to each other, one of said sections providing a support for grain cutting and conveying mechanisms and the other of said sections providing a support for a grain reel, means for rotating said shaft to adjust the angularity of said auxiliary frame structure relative to said main frame arms, thereby positioning said grain cutting and conveying mechanisms and said grain reel relative to the ground, and other means on said main frame arms adapted to react on the said tractor for adjusting the position of said main frame arms relative to the tractor.

7. In a push-type windrower for use with a tractor, said windrower having a grain reel and grain cutting and conveying mechanisms, a pair of longitudinally extending, spaced-apart main frame arms, brackets adapted to be attached to the associated tractor, means for pivotally supporting said frame arms on said brackets about a horizontally disposed, transversely extending axis, said arms being connected together at their forward ends by a transversely extending, tubular member, a shaft rotatably supported in said tubular member with the ends of said shaft extending beyond the ends of said tubular member, an auxiliary frame structure which includes a depending section and a forwardly extending section supported on said shaft, said depending section and said forwardly extending section being shiftable relative to one another, said depending section providing a support for the grain cutting and conveying mechanisms and said forwardly extending section providing a support for the grain reel, adjustable means connecting the two sections of said auxiliary frame structure for altering the operative relation of said grain reel relative to said grain cutting and conveying mechanisms, means for rotating said shaft in said tubular member to adjust the angularity of said auxiliary frame structure relative to said main frame arms, thereby positioning said grain cutting and conveying mechanisms and said grain reel relative to the ground, and other means on said main frame arms adapted to react on the said tractor for adjusting the position of said main frame arms relative to the tractor.

CHARLES W. HANSEN.
FRANK N. G. KRANICK.

REFERENCES CITED

The following references are of record in the file of this patent:

UNITED STATES PATENTS

| Number | Name | Date |
|---|---|---|
| 1,045,338 | Steward | Nov. 26, 1912 |
| 1,090,246 | Steward | Mar. 17, 1914 |
| 1,148,644 | Will | Aug. 3, 1915 |
| 1,214,242 | Veatch | Jan. 30, 1917 |
| 1,271,845 | Bryant | July 9, 1918 |
| 1,278,102 | Burgess | Sept. 10, 1918 |
| 2,048,940 | McGregor | July 28, 1936 |